United States Patent
Batson et al.

(10) Patent No.: US 12,199,246 B2
(45) Date of Patent: Jan. 14, 2025

(54) STACKED PRISMATIC ARCHITECTURE FOR ELECTROCHEMICAL CELL

(71) Applicant: A123 Systems LLC, Novi, MI (US)

(72) Inventors: David C. Batson, Winchester, MA (US); Alex Quinn, Brighton, MA (US); Aleksey Rybalnik, Framingham, MA (US); John McLaughlin, Norwood, MA (US)

(73) Assignee: A123 SYSTEMS LLC, Waltham, MA (US)

( * ) Notice: Subject to any disclaimer, the term of this patent is extended or adjusted under 35 U.S.C. 154(b) by 394 days.

(21) Appl. No.: 16/714,633

(22) PCT Filed: Jun. 6, 2018

(86) PCT No.: PCT/US2018/036294
§ 371 (c)(1),
(2) Date: Dec. 13, 2019

(87) PCT Pub. No.: WO2018/231605
PCT Pub. Date: Dec. 20, 2018

(65) Prior Publication Data
US 2021/0184265 A1 Jun. 17, 2021

Related U.S. Application Data

(60) Provisional application No. 62/520,478, filed on Jun. 15, 2017.

(51) Int. Cl.
*H01M 10/0585* (2010.01)
*H01M 50/178* (2021.01)
(Continued)

(52) U.S. Cl.
CPC ....... *H01M 10/0585* (2013.01); *H01M 50/30* (2021.01); *H01M 50/54* (2021.01);
(Continued)

(58) Field of Classification Search
CPC .. H01M 10/0585; H01M 50/60; H01M 50/30; H01M 50/531; H01M 50/178;
(Continued)

(56) References Cited

U.S. PATENT DOCUMENTS 6,159,631 A   12/2000 Thompson et al.
6,515,449 B1 *  2/2003 Thomas ............ H01M 50/533
                                                       429/129
(Continued)

FOREIGN PATENT DOCUMENTS

CN   101140983 A   3/2008
CN   101401229 A   4/2009
(Continued)

OTHER PUBLICATIONS

EPO machine generated English translation of KR-20080037868-A (Year: 2008).*

(Continued)

*Primary Examiner* — Sean P Cullen
*Assistant Examiner* — Kimberly Wyluda
(74) *Attorney, Agent, or Firm* — McCoy Russell LLP

(57) ABSTRACT

A battery cell system and method for manufacturing a battery cell system is provided. The battery cell system includes an electrode stack including a first anode with a first anode tab, a second anode with a second anode tab laterally offset from the first anode tab, a first cathode with a first cathode tab, and a second cathode with a second cathode tab laterally offset from the first cathode tab.

18 Claims, 10 Drawing Sheets

(51) Int. Cl.
*H01M 50/30* (2021.01)
*H01M 50/536* (2021.01)
*H01M 50/54* (2021.01)
*H01M 50/55* (2021.01)
*H01M 50/627* (2021.01)

(52) U.S. Cl.
CPC ........ *H01M 50/178* (2021.01); *H01M 50/536* (2021.01); *H01M 50/55* (2021.01); *H01M 50/627* (2021.01)

(58) Field of Classification Search
CPC .... H01M 50/536; H01M 50/54; H01M 50/55; H01M 50/627
See application file for complete search history.

(56) References Cited

U.S. PATENT DOCUMENTS

| | | | |
|---|---|---|---|
| 7,722,987 | B2 | 5/2010 | Drews et al. |
| 8,133,609 | B2 | 3/2012 | Kim et al. |
| 2007/0207378 | A1* | 9/2007 | Mizuta ................... H01M 50/55 429/176 |
| 2011/0223461 | A1* | 9/2011 | Kim ..................... H01M 50/124 429/163 |
| 2011/0223474 | A1* | 9/2011 | Kim ..................... H01M 50/579 429/181 |
| 2012/0009467 | A1* | 1/2012 | Park ..................... H01M 50/129 429/163 |
| 2012/0164520 | A1 | 6/2012 | Choi |
| 2012/0202105 | A1 | 8/2012 | Shinyashiki et al. |
| 2013/0143109 | A1 | 6/2013 | Kim et al. |
| 2016/0248115 | A1 | 8/2016 | Hatta et al. |
| 2017/0033342 | A1 | 2/2017 | Ueda et al. |
| 2017/0187082 | A1* | 6/2017 | Zhao ..................... B64C 39/024 |
| 2017/0244129 | A1* | 8/2017 | Seong ............... H01M 10/0587 |
| 2018/0287117 | A1* | 10/2018 | Karulkar ............. H01M 50/645 |

FOREIGN PATENT DOCUMENTS

| | | | | |
|---|---|---|---|---|
| CN | 103081161 | A | | 5/2013 |
| DE | 10352046 | A1 | | 6/2005 |
| EP | 2306566 | A1 | | 4/2011 |
| EP | 2360770 | A2 | | 8/2011 |
| JP | H0513054 | A | | 1/1993 |
| JP | 2009187675 | A | | 8/2009 |
| JP | 2009289683 | A | | 12/2009 |
| JP | 2012209261 | A | | 10/2012 |
| JP | 2013187077 | A | | 9/2013 |
| JP | 2013251084 | A | * | 12/2013 |
| JP | 2014086388 | A | | 5/2014 |
| JP | 2015095285 | A | | 5/2015 |
| JP | 2017076576 | A | | 4/2017 |
| KR | 2007-0106813 | A | * | 11/2007 ............ H01M 50/10 |
| KR | 20080037868 | A | * | 5/2008 .......... H01M 50/105 |
| KR | 101416544 | B1 | | 7/2014 |
| KR | 20150034498 | A | * | 4/2015 ............ H01M 50/10 |
| KR | 20160134164 | A | | 11/2016 |
| WO | 2009031442 | A1 | | 3/2009 |

OTHER PUBLICATIONS

Machine generated English translation of KR-20150034498-A obtained from Global Dossier (Year: 2015).*
EPO machine generated English translation of KR-2007-0106813-A (Year: 2007).*
EPO machine generated English translation of JP 2015-095285A (Year: 2015).*
EPO machine generated English translation of JP-2013251084-A (Year: 2013).*
ISA Korean Intellectual Property Office, International Search Report Issued in Application No. PCT/US2018/036294, Sep. 27, 2018, WIPO, 2 pages.
European Patent Office, Office Action Issued in Application No. 18817955.0, Jul. 31, 2023, Germany, 5 pages.

* cited by examiner

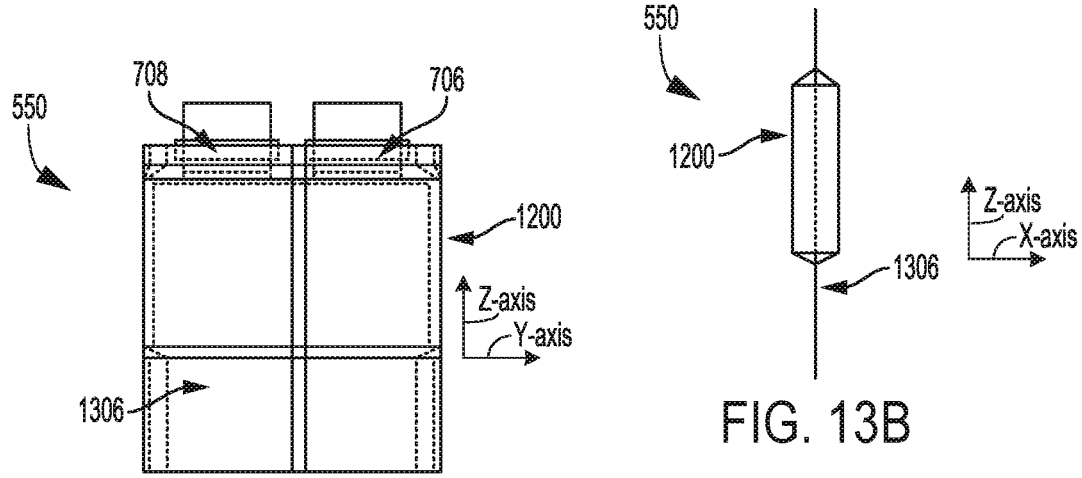
FIG. 13A
FIG. 13B
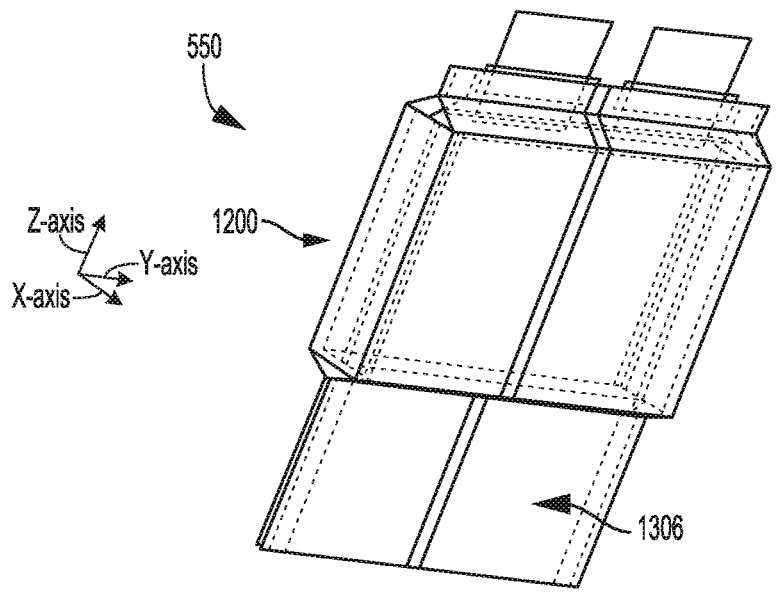
FIG. 14

STACKED PRISMATIC ARCHITECTURE FOR ELECTROCHEMICAL CELL

CROSS-REFERENCE TO RELATED APPLICATIONS

The present application is a U.S. National Phase of International Patent Application Serial No. PCT/US2018/036294 entitled "STACKED PRISMATIC ARCHITECTURE FOR ELECTROCHEMICAL CELL", filed on Jun. 6, 2018. International Patent Application Serial No. PCT/US2018/036294 claims priority to U.S. Provisional Application No. 62/520,478, entitled "STACKED PRISMATIC ARCHITECTURE FOR ELECTROCHEMICAL CELL", and filed on Jun. 15, 2017. The entire contents of each of the above-listed applications are hereby incorporated by reference for all purposes.

FIELD

The present application relates a battery cell system and a method for manufacturing a battery cell system.

BACKGROUND AND SUMMARY

The search for cost-effective solutions to increase battery capacity is a significant challenge. As the price-per-kWh continues to drop for battery electrochemical storage, there is a need to build larger, higher-capacity batteries which can also be used for high-power applications. Many types of electrochemical cells have electrodes in 'sheet' form, wherein sheets of positive and negative electrode material are stacked together and separated by electrically insulating porous separator sheets. In order to increase overall capacity (e.g., total usable energy) of the cell, close contact between sheets, or electrodes, may be desired.

A large geometric surface area may be desired for a high-power, low-impedance electrochemical cell having stacked prismatic cell architecture. In manufacturing a typical battery comprising a stacked prismatic cell, the stack is formed by layers of electrode cells which may contain lithium-ion or other electrochemical materials useful for secondary batteries, or secondary cells. When the electrodes of the electrode stack remain in very close contact with one another throughout the life of the cell, the battery can achieve a desired capacity. However, if the electrode stack achieves less than desired contact between sheets, then tension between sheets or between sheets and the battery housing may arise due to gas generated within the battery during the cycling of the battery. In order to increase battery capacity and provide desired electrode stacking, many solutions have been proposed.

One proposed example is shown in U.S. Pat. No. 8,133,609. Therein, a battery comprising a plurality of cells, or plates, has tabs from each cell welded to a lead portion, and the lead portion is protected by an enclosure. Another example is shown in U.S. Pat. No. 6,159,631. Therein, a variety of scored regions located on a cell can, or housing, are provided in order to release excess pressure over a narrow and controllable range, in order to avoid explosion in the event of a large battery swell.

However, the inventors herein have identified potential issues with such systems related to layering of battery cells, welding of battery cells, housing manufacture and assembly, and the design and manufacture of release or safety ventilation. For example, a normal battery having a high-power stacked prismatic cell has a plurality of layers of cells, or electrode cells. The number of layers is limited by the welding technique used to weld the tabs, or electrodes, of each layer together. In particular, the number of electrodes included in a cell is limited by the durability of electrode tabs when exposed to the energy of welding. Thus, as the number of electrodes increases, and therefore the weld intensity needed to weld all of the electrodes increases, the electrodes may be more susceptible to degradation (e.g., melting, deformation, etc.). For example, current manufacturing techniques utilize a large electrode dimension and a layer count often less than 60 layers, and typically in the range of 20-30 layers. Additionally, the thickness of a cell may be limited to 15 mm due to manufacturing limitations of the housing.

Furthermore, the housing imposes an additional limitation of constraining the depth to which housing material can be formed. Often housing is formed from aluminum, and the shape of the housing is formed from aluminum sheet metal in a similar fashion to the way in which sheet metal is stamped. However, during conventional housing forming processes, the aluminum, or other housing material, is stretched and its thickness is reduced, thereby reducing the strength of the material. Additionally, previous secondary, or rechargeable, batteries do not include safety valves or gas-releasing apparatus in order to deal with catastrophic failure of one or more battery cells.

In one embodiment, some of the above issues may be at least partially addressed by a battery cell system comprising an electrode stack including a first anode with a first anode tab, a second anode with a second anode tab laterally offset from the first anode tab, a first cathode with a first cathode tab, and a second cathode with a second cathode tab laterally offset from the first cathode tab. By offsetting tabs of like polarity electrodes, the number of electrode tabs in a welded group may be reduced, if desired. As such, the number of electrodes included in a cell may be increased without unduly increasing the thickness of the groups of electrode tabs. Consequently, the risk of electrode tab degradation (e.g., deformation, melting, etc.) caused by increased intensity welding may be reduced. In this way, a higher power cell with increased durability may be achieved, if desired.

BRIEF DESCRIPTION OF THE DRAWINGS

FIGS. 13A and 13B show different views of the protective housing in the battery cell system.

FIG. 14 shows another view of the protective housing in the battery cell system.

FIGS. 2A-17 are drawn to scale, although other relative dimensions may be used, if desired.

DETAILED DESCRIPTION

Figure 16:
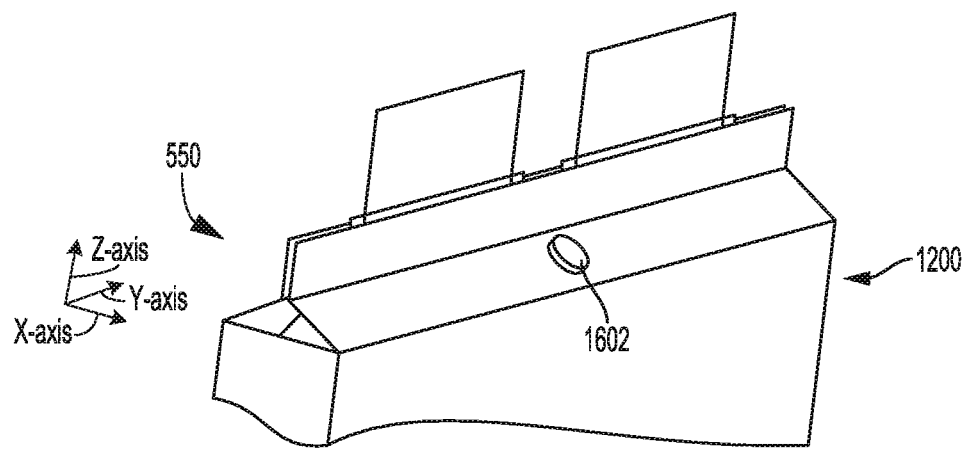
FIG. 16 shows a pouch top with a filling or ventilation port in the battery cell system.
Figure 17:
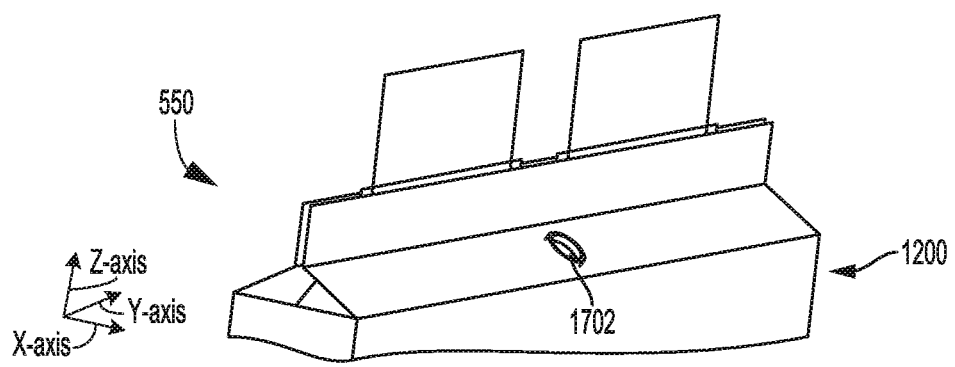
FIG. 17 shows a rupture disc vent installed in the filling or ventilation port in the battery cell system.
Figure 18:
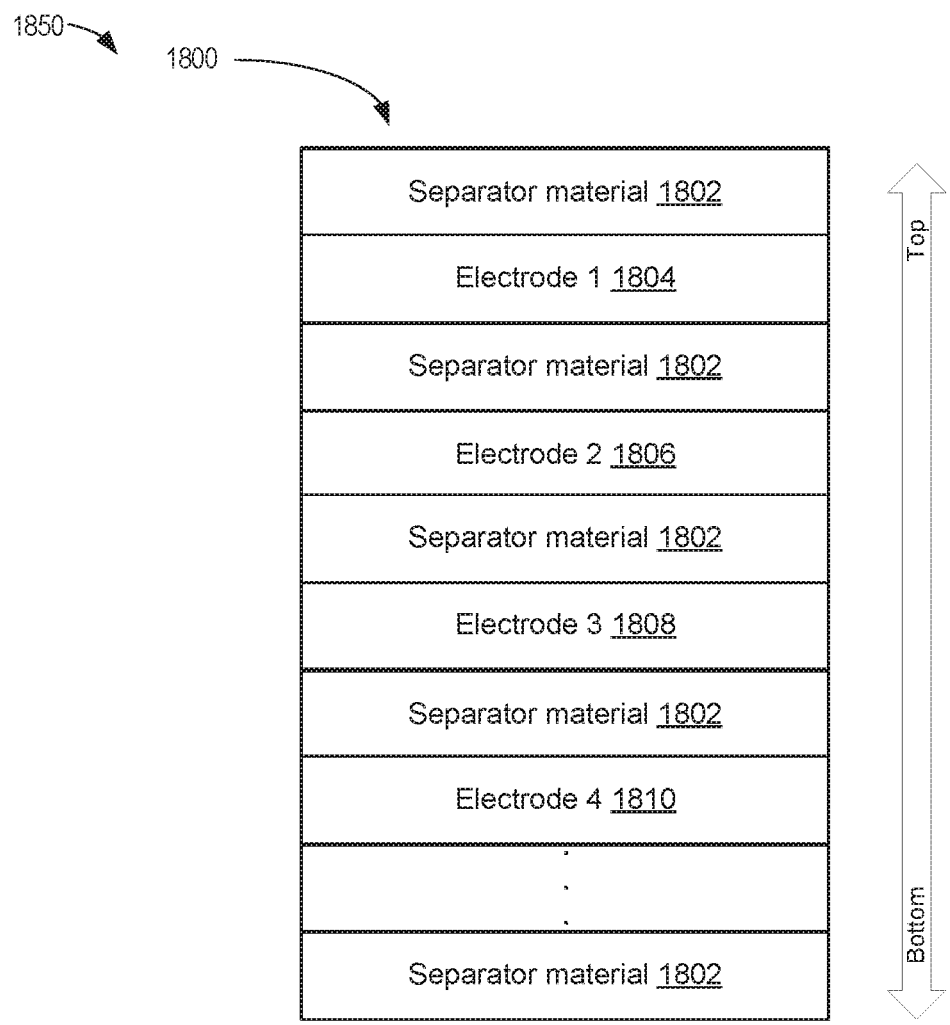
FIG. 18 shows an example of an electrode stack pattern in a battery cell system.
Figure 19:
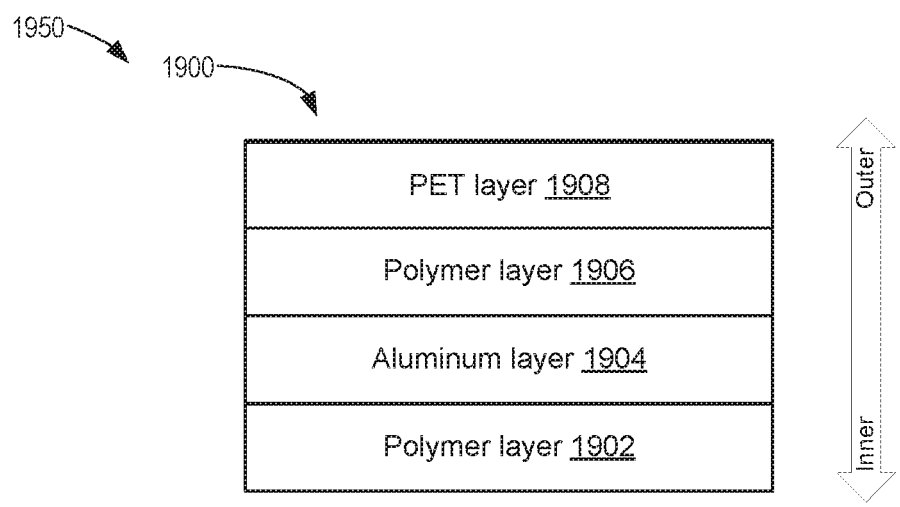
FIG. 19 shows layers of a laminate pouch in a battery cell system.
Figure 20:
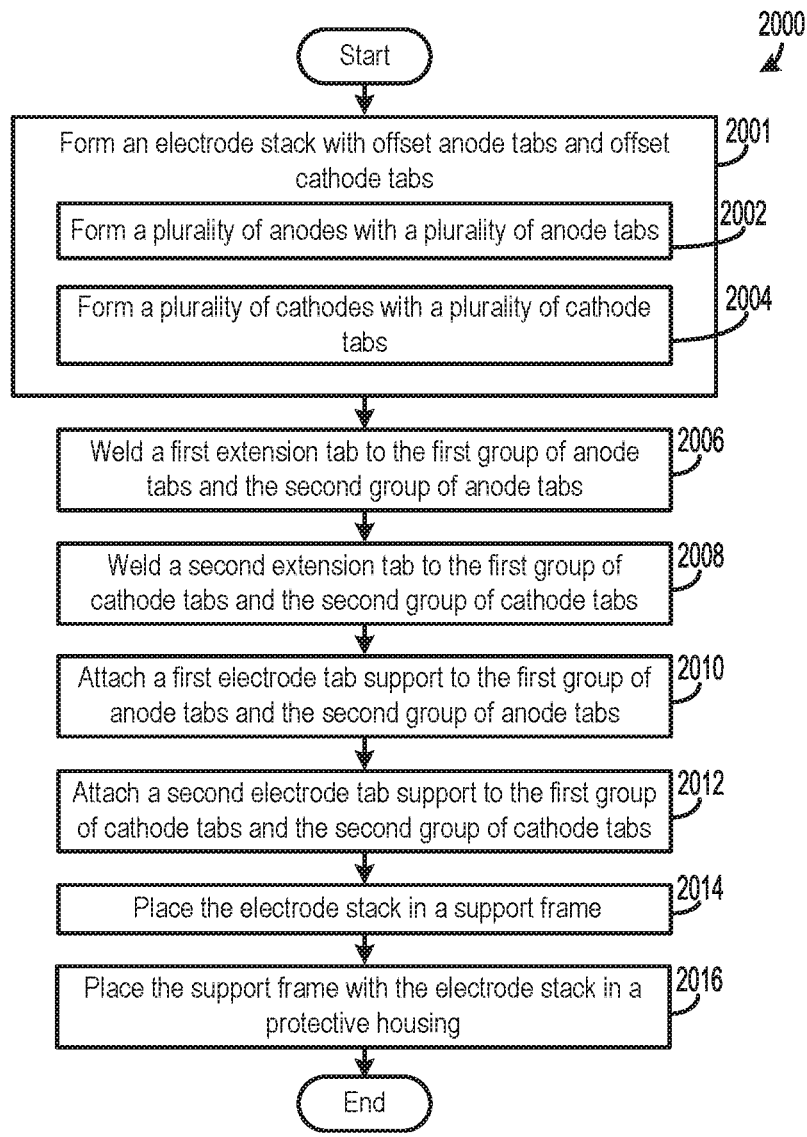
FIG. 20 shows a method for manufacturing a battery cell system.

The following description relates to a battery cell system with a stacked electrochemical cell battery (e.g., stacked prismatic electrochemical cell battery) and a method for manufacturing the battery cell system. It will be appreciated that FIGS. 2A-20 may be discussed collectively. FIGS. 2A-15 show different stages of assembly of a battery cell system 550. FIGS. 16-17 show example configurations of a protective housing in the battery cell system. FIG. 18 shows an example of layers an electrode stack that may be included in the battery cell system. FIG. 19 shows an example of layers in a protective housing in the battery cell system. FIG. 20 shows a method for manufacturing a battery cell system. Furthermore, axes X, Y and Z are provided for references in FIGS. 2A-17. In one example, the Z-axis may be parallel to a gravitational axis and therefore may be referred to as a vertical axis. Additionally, the Y-axis may be a lateral axis and the X-axis may be a longitudinal axis. However, the axes may have alternate orientations, in other examples.

Figure 1:
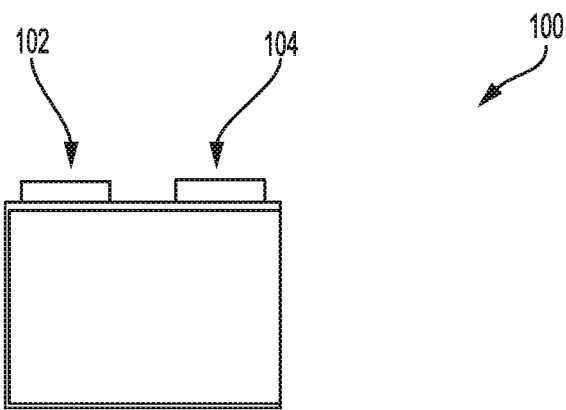
FIG. 1 shows an example of a prior art electrochemical cell.

The stacked cell battery described herein is an improvement upon FIG. 1 (prior art). Prior art FIG. 1 shows an example of an electrode stack 100 having a plurality of anode foil tabs 102 and cathode foil tabs 104. As shown in FIG. 1 the anode foil tabs 102 are laterally aligned with one another. The cathode foil tabs are likewise laterally aligned with one another.

In the description herein, an anode is a positive electrode and a cathode is a negative electrode. It will be appreciated that a negative electrode is an electrode through which conventional current leaves the device and a positive electrode is an electrode through which conventional current enters the device. As such, the anodes and cathodes may be generally referred to as electrodes, in some examples.

Figure 3:
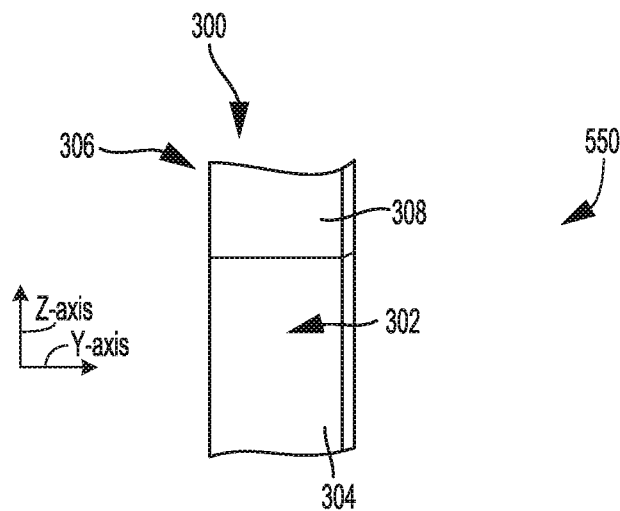
FIG. 3 shows coated sheet material of the anode in the battery cell system.
Figure 5:
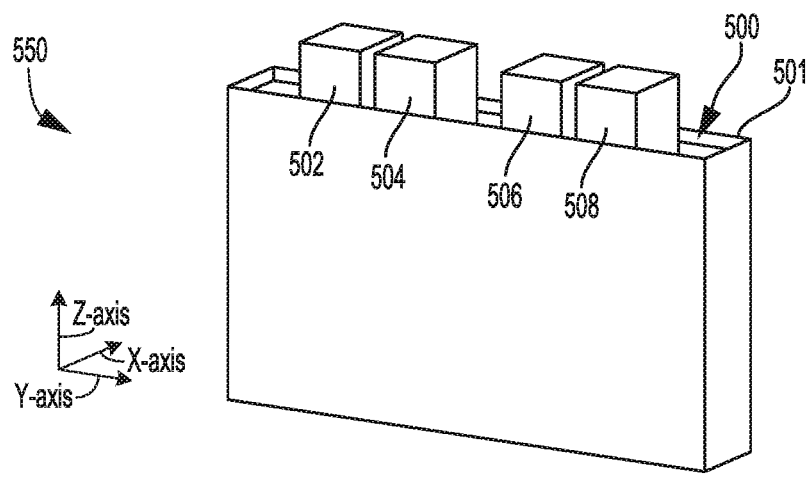
FIG. 5 shows an electrode stack with interleaved tabs in the battery cell system.

FIG. 3 shows an example anode 300 that may be included in an electrode stack, such as electrode stack 500 shown in FIG. 5. The anode 300 may comprise an anode coating 302, coated onto both sides of an anode electrode sheet 306 designed to collect current. The anode electrode sheet 306 may comprise a metallic foil substrate, and the coating 302 may comprise an electrochemically active anode material (e.g., electro-active Lithium intercalation material) such as a mixture of natural and artificial graphite or Lithium-titanate, or metallic Lithium. Thus, the anode 300 may comprise a metallic foil substrate (e.g., anode electrode sheet 306) that is partially or wholly covered with the coating 302. The coating 302 may be applied over a specific portion of the anode electrode sheet 306, such as over a specific width of the anode electrode sheet 306, but not all of the anode electrode sheet 306, such that at least a portion of the anode electrode sheet 306 may remain uncoated. Thus, the anode 300 may comprise a coated section 304 which contains the coating 302, and an uncoated section 308 that comprises the anode electrode sheet 306 and protrudes from the coated section 304. The coated sheet material may then be slit along alternating edges of the coated sections, resulting in a continuous electrode material with exposed uncoated foil extended a specific width from the coated area on one edge of the electrode.

Figure 4:
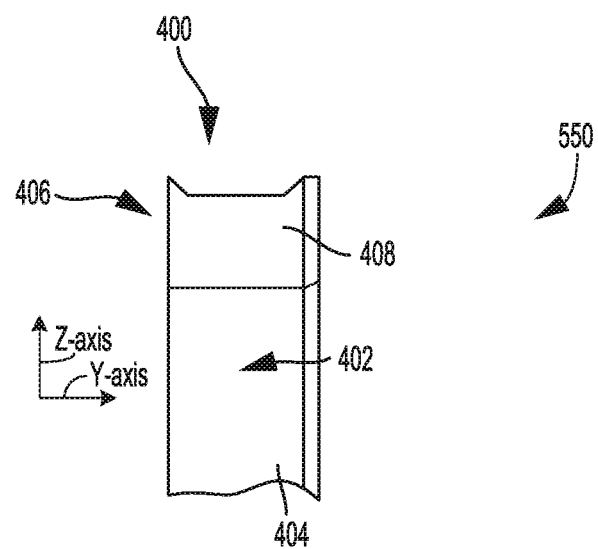
FIG. 4 shows coated sheet material of the cathode in the battery cell system.

FIG. 4 shows an example cathode 400 that may be included in the electrode stack 500, shown in FIG. 5. Cathode 400 may also be referred to as positive electrode 400, in some examples. In one example, the cathode 400 may be similar in size and configuration to anode 300 (it may comprise similar dimensions and may be partially covered with a coating). However, in other examples, the cathode 400 may have a different size, shape, etc., than the anode. Furthermore, the cathode 400 is comprised of different materials than the anode 300. In particular, the cathode 400 may include a mixture of specially prepared Lithiated Iron-Phosphate powder or Lithiated Metal-oxide powder, conductive carbon and polymeric binder. Specifically, the cathode 400 may comprise a cathode electrode sheet 406 coated in a cathode coating 402. The cathode electrode sheet 406 may also comprise a metallic foil current collector substrate, similar to the anode electrode sheet 306 of the anode 300, but the coating 402 may comprise the different mixture of specially prepared powder. In particular, the cathode coating 402 may comprise an electrochemically active cathode material such as the mixture of specially prepared Lithiated Iron-Phosphate powder or Lithiated Metal-oxide powder, conductive carbon and polymeric binder referenced above. Thus, the cathode 400 may be prepared in a similar fashion as the anode 300, except that the coatings of the anode and cathode are different. Similar to the coating on anode 300, the coating 402 may be applied over a specific portion of the electrode sheet 406, such as over a specific width of the electrode sheet 406, but not all of the sheet 406, such that at least a portion of the sheet 406 may remain uncoated. Thus, the cathode 400 may comprise a coated section 404 that contains the coating 402, and an uncoated section 408 that comprises the electrode sheet 406. The coated sheet material may then be slit along alternating edges of the coated sections, resulting in a continuous electrode material with exposed uncoated foil extended a specific width from the coated area on one edge of the electrode.

Thus, an uncoated portion of the electrode sheets 306 and 406 may extend beyond and protrudes from the coatings 302 and 402. As discussed in greater detail herein, the protruding portions of the electrode sheets 306 and 406 may be trimmed down to narrower tabs. After trimming, these narrowed, cut uncoated electrode areas may be referred to as electrode tabs (as will be described in greater detail herein). Thus, the trimmed electrode sheets 306 and 406 may be referred to as electrode tabs 212, 216, 220, and 224.

Thus, the continuous rolls of coated, calendered, and slit electrodes 300 and 400, may be stamped to desired dimensions using a normal stamping process, such as a steel ruled die or a close clearance-stamping die. The stamped electrode shape may also be created by laser cutting. In the prior art prismatic cells, each of the first and second electrodes would have identical foil tabs remaining after stamping (see FIG.

1), such that when stacked into a cell electrode stack, the individual foil tabs 102 of the first electrode would all align in a single position relative to one corner of the electrode stack. All the stamped foil tabs 104 of the second electrode would likewise all align together at a different single position relative to the electrode stack corner.

Figure 2A:
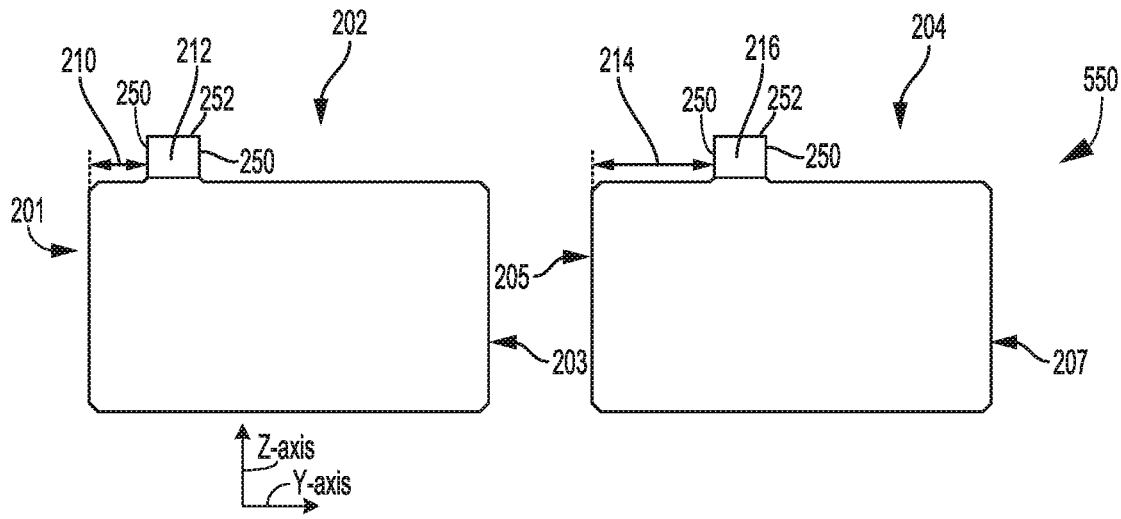
FIGS. 2A and 2B show, respectively, cathodes and anodes in a battery cell system.
Figure 2B:
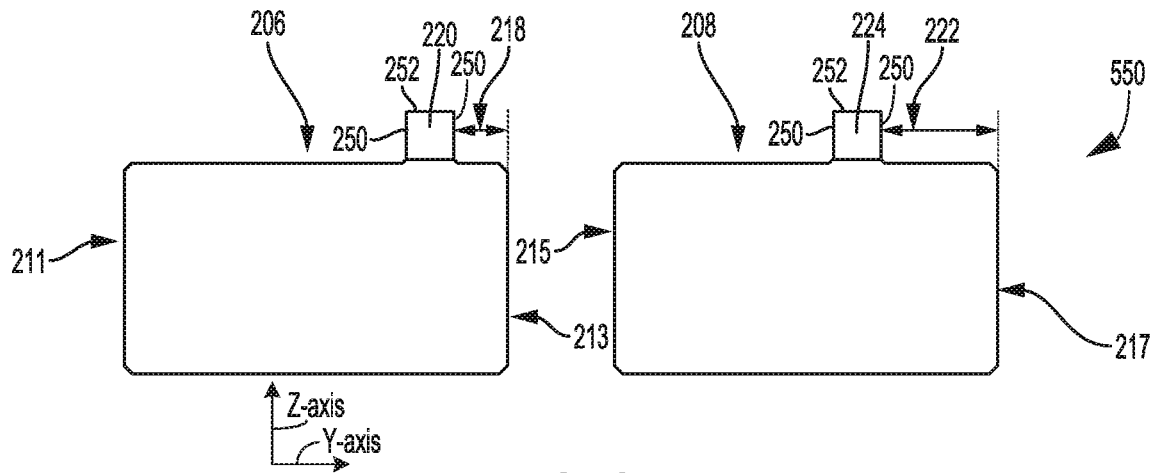

Referring now to FIGS. 2A and 2B, as an improvement over the above-mentioned prior art, the presently disclosed battery cell system. The continuous rolls of coated calendered and slit electrode materials are stamped to desired dimension using stamping techniques, but each of the cathodes and anodes, 300 and 400 respectively, are stamped into two different electrode dimensions, differing in the position of the remaining foil tab, resulting in two different stamped cathodes 202 and 204 and two different stamped anodes 206 and 208. The stamped, cathodes 202 and 204 may comprise electrode tabs 212 and 216, respectively. Thus, first cathode 202 may comprise a first cathode tab 212, and the second cathode 204 may comprise a second cathode tab 216. Similarly, the first anode 206 may comprise a first anode tab 220 and the second anode 208 may comprise a second anode tab 224. As described in greater detail herein, the cathodes 202 and 204 and the anodes 206 and 208 may be stacked to form an electrode stack (e.g., the electrode stack 500 shown in FIG. 5). In particular, up to 150 of the electrodes (e.g., cathodes 202 and 204 and/or anodes 206 and 208) may be stacked together to form the electrode stack. When stacked, the electrodes may be aligned with one another such that the ends of the electrodes are aligned. Thus, first ends 201, 205, 211, and 215 of the electrodes 202, 204, 206, and 208 may be aligned, and second ends 204, 207, 213, and 217 may be aligned. However, the tabs 212, 216, 220, and 224 may be laterally offset from one another when the electrodes are stacked, and thus, the tabs 212, 216, 220, and 224 may not overlap with one another.

As described above, the cathode tabs 212 and 216 may extend from the cathode electrode sheet 406 that has been cut down to the example dimensions shown in FIG. 2A. Thus, the cathode tabs 212 and 216 may have a similar (e.g., equivalent) composition, and may have a similar (e.g., equivalent) size, shape, and/or geometry, except that they are laterally offset from one another when the cathodes 202 and 204 are aligned with one another. Said another way, the protruding electrode sheet 306 of the cathodes 202 and 204 may be cut differently, such that their resulting cathode tabs, 212 and 216 respectively, are offset from one another, and do not overlap when stacked as shown in FIG. 5. The cathodes 202 and 204 may be aligned with another when stacked in the electrode stack (e.g., electrode stack 500 shown in FIG. 5) by aligning first ends 201 and 205 of the cathodes 202 and 204, respectively. As shown in the example of FIG. 2A, the tabs 212 and 216 may be positioned closer to the first ends 201 and 205 of the cathodes 202 and 204, respectively, than the second ends 203 and 207. Offsetting groups of anode tabs as well as cathode tabs allows the thickness of the tab stacks to be reduced when compared to previous cell stacks in which the electrode tabs of like charge are aligned. Reducing the thickness of the tab stack allows the energy used to weld the tab stacks to be reduced, in turn. As a result, the likelihood of cell stack degradation (e.g., unwanted deformation, melting, etc.) caused by increased welding intensity may be reduced, if desired. As a result, the size of the battery system may be increased without unduly increasing the thickness of the tab stacks above an undesirable value.

Thus, cathode tab 212 may be spaced away from the first end 201 of the cathode 202 by a distance defined by a first tab offset 210. Similarly, the cathode tab 216 may be spaced away from a first end 205 of the cathode 204 by a distance defined by a second tab offset 214. However, the second tab offset 214 may be greater (e.g., a greater distance) than the first tab offset 210. In this way, the tab 216 of the cathode 204 may be spaced a greater distance away from the first end 205 of the cathode 204, than the cathode tab 212 of the cathode 202 that is spaced from the first end 201 of the cathode 202. In particular, the second tab offset may be sized such that the tab 216 does not overlap any of the cathode tab 212 when the cathodes 202 and 204 are aligned with one another by aligning their first ends 201 and 205, and second ends 203 and 207 with one another.

FIG. 2B shows a similar electrode tab spacing to the cathode tab spacing shown in FIG. 2A, except that FIG. 2B shows the electrode tab spacing for the anodes 206 and 208. Thus, anode tabs 220 and 224 of the anodes 206 and 208, respectively may have a similar (e.g., equivalent) size, shape, and/or geometry as the cathode tabs 212 and 216, except that unlike the tabs 212 and 216 of the cathodes 202 and 204, the anode tabs 220 and 224 of the anodes 206 and 208 may be spaced closer to the second ends 213 and 217 of the anodes 206 and 208 than first ends 211 and 215.

Thus, electrode tab 220 may be spaced away from the second end 213 of the anode 206 by a distance defined by a first tab offset 218. Similarly, the anode tab 224 may be spaced away from a second end 217 of the anode 208 by a distance defined by a second tab offset 222. However, the second tab offset 222 may be greater than the first tab offset 218. In this way, the tab 224 of anode 208 may be spaced a greater distance away from the second end 217 of the anode 208, than the tab 220 of the anode 206 is spaced from the second end 213 of the anode 206. In particular, the second tab offset 222 may be sized such that the tab 224 does not overlap any of the tab 220 when the anodes 206 and 208 are aligned with one another by aligning their first ends 211 and 215, and second ends 213 and 217 with one another.

When the tabs are offset, lateral sides 250 of the offset tabs are spaced away from one another such that they are laterally separated. Furthermore, the top sides 252 of the tabs shown in FIGS. 2A and 2B have a similar height. However, in other examples, the top sides 252 of the tabs may have non-equivalent heights. Furthermore, in other examples, the first group of anode tabs may be offset from the second group of anode tabs by a different amount than the offset between the groups of cathode tabs.

During the electrode stacking process the two different cathodes 202 and 204 and two different anodes 206 and 208 may be alternatively stacked and may be separated by insulating porous separator material. The lateral offset between the stamped tabs of the same polarity electrodes is determined from the sum of the tolerances for stamping width and position and the stacking position tolerance of each electrode, such that a small gap may be maintained between the electrode tabs of each type.

Referring now to FIG. 5, it shows the battery cell system 550 including the electrode stack 500 and the structural frame 501. The battery cell system 550 may also include a protective housing such as the laminate pouch 1200, shown in FIG. 12 and discussed in greater detail herein. FIG. 5 also shows the cathodes 202 and 204 and the anodes 206 and 208 forming an electrode stack 500. Although the electrode stack 500 may include the first and the second cathodes 202 and 204, respectively, and/or the first and the second anodes 206 and 208, respectively, in one example. It will be appreciated that in other examples, the electrode stack 500 may include more than two anodes and/or cathodes.

The electrodes may be held in place by a structural frame 501. Thus, when stacked, the tabs 212, 216, 220, and 224 of the electrodes 202, 204, 206, and 208 may form four distinct groups of tabs, each of the groups comprising the same type of electrode. However, in some examples, the foil tabs may be rearranged to any desirable order. Thus, a first electrode tab group 502 may comprise the tab 212 of the first cathode 202, the second electrode tab group 504 may comprise the tab 216 of the second cathode 204, the third electrode tab group 506 may comprise the tab 220 of the first anode 206, and the fourth electrode tab group 508 may comprise the tab 224 of the second anode 208. Each of the groups 502, 504, 506, and 508 may comprise a plurality of the respective type of electrode tab, in some examples. Further, in some examples, each of the groups may comprise the same number of electrode tabs. However, in other examples, the groups may comprise different numbers of electrode tabs. For instance, up to 150 electrodes may be stacked in the electrode stack 500. However, since the stack includes two different cathode tab groups offset from one another and two different anode tab groups offset from another, the number of tabs in each of the groups may be reduced when compared to approaches where all of the cathode tabs are aligned with one another and all of the anode tabs are aligned with one another.

In further examples, more than two offset anode and/or cathode tabs may be used in the electrode stack. Thus, more than two offset groups of positive and more than two offset groups of negative electrodes may be used in the electrode stack. By increasing the number of offset tabs that are utilized in the electrode stack, the number of electrodes that may be included in the stack may be increased.

Assembling the electrode stack 500, may include utilizing a specialized stacking machine, in one example. The specialized stacking machine includes a continuous sheet of porous separator material that is 'Z' folded around the alternating stacked electrodes (e.g., cathodes and anodes), resulting in a rectangular or prismatic shape electrode stack 500 of alternating cathodes and anodes with four distinct groups of foil tabs extending beyond the edges of the separator on a single edge of the stack or from opposing sides of the electrode stack. As an example, electrode stack 500 may be wrapped in porous separator material after Z-wrapping the alternating electrodes. The porous separator material allows the anodes and the cathodes to be separated to reduce the likelihood of unwanted interaction (e.g., short circuit) between the anodes and cathodes while allowing the transportation of ionic charge carriers. It will be appreciated that other manufacturing techniques for the electrode stack 500 have been contemplated.

Figure 6:
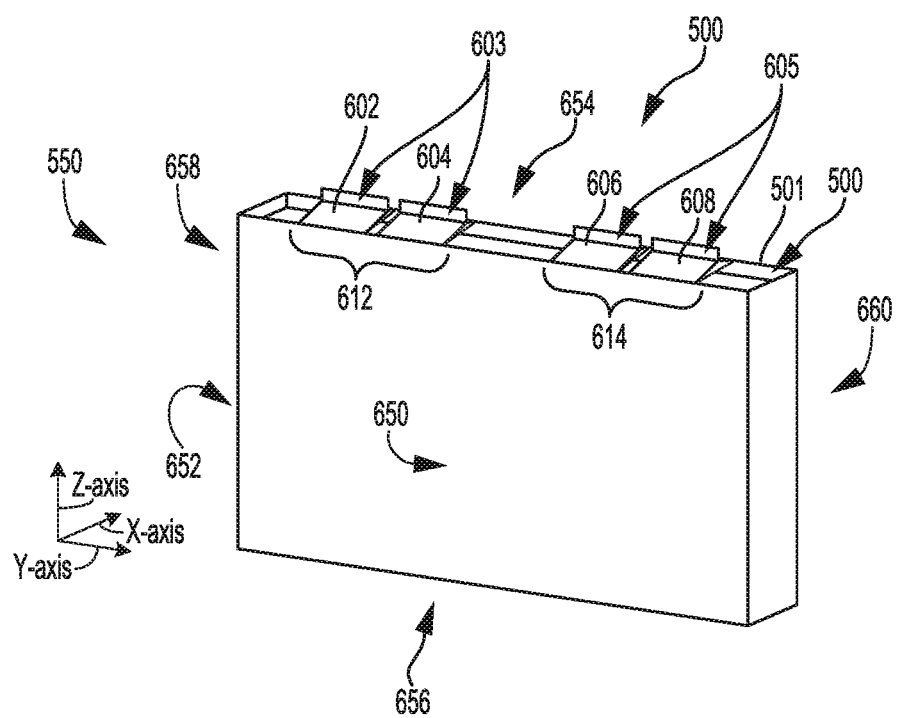
FIG. 6 shows an electrode stack with trimmed tabs for welding in the battery cell system.

After stacking, as shown in FIG. 5, the tabs of the tab groups 502, 504, 506, and 508, may be trimmed, shaped, bent, folded, etc., to a desired shape (e.g., a final shape), an example of which is shown in FIG. 6. FIG. 6, shows the electrode stack 500 after removal from the stacking machine, where the electrode stack 500 is placed in the structural frame 501 (e.g., holding fixture) and the extending tab groups 502, 504, 506, and 508 are shaped and trimmed to a desired shape (e.g., final shape) and dimension they may have after welding of a cell extension tab. As shown in FIG. 6, the trimmed and shaped tab groups may be referred to herein as shaped tab groups 602, 604, 606, and 608. Thus, the tab groups 602, 604, 606, and 608, are the tab groups 502, 504, 506, 508 that have been trimmed and shaped to a desired shape prior to welding. The negative electrode groups 602 and 604 including the negative electrode tabs may be referred to collectively as the cathode tabs 612, and the positive electrode groups 606 and 608 may be referred to collectively as the anode tabs 614. In some cases, a small ultrasonic pre-weld may be employed to hold the tabs in the desired shape for consolidation and extension tab welding.

Figure 7:
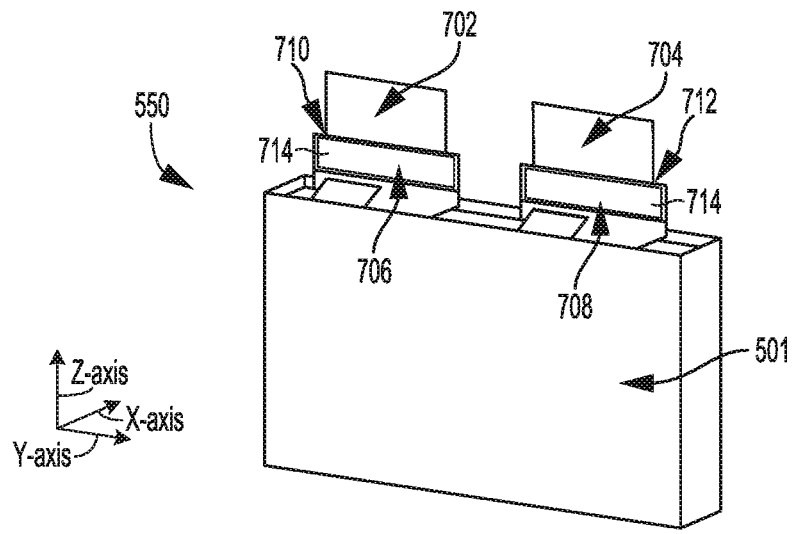
FIG. 7 shows an electrode stack with welded extension tabs in the battery cell system.

As shown in FIG. 6, the tab groups 502, 504, 506, and 508 may be trimmed such that the resulting tabs 612 and 614 may include vertical welding surfaces 603 and 605, respectively, which may be welded directly to extension tabs as shown and described in greater detail herein with reference to FIG. 7.

FIG. 6 also shows a front side 650, a backside 652, a top side 654, a bottom side 656, a first lateral side 658, and a second lateral side 660 of the battery cell system 550. The structural frame 501 may partially enclose the electrode stack 500. Specifically, the structural frame 501 extends down the front side 650, the backside 652, the first lateral side 658, and the second lateral side 660 of the system. In this way, the structural frame 501 may provide structural reinforcement to the battery cell system 550.

Turning to FIG. 18, a general stacking sequence for forming an electrode stack 1800 in a battery cell system 1850, is illustrated. The battery cell system 1850 may be an example of the battery cell system 550, shown in FIGS. 2A-17. The electrode stack 1800 may be arranged according to the following the pattern: separator material 1802/first electrode 1804/separator material 1802/second electrode 1806/separator material 1802/third electrode 1808/separator material 1802/fourth electrode 1810 and so one and so forth. In this non-limiting example, elements 1804, 1806, 1808, and 1810 may correspond to any of the first and second positive and negative electrodes shown in FIGS. 2A and 2B. However, other stacking sequences have been contemplated. Furthermore, it will be appreciated that the cell stacking pattern shown in FIG. 18 may be repeated as many times as desired. In some examples, the pattern may be repeated between 20 and 60 times. As an example, indicated by the bottom-most separator material 1802 (bottom and top distinguished by arrow adjacent to electrode stack), the stack may be started at the top with a layer of separator material and ended at the bottom with a lower (e.g., final) layer of separator material.

As an example, with reference to FIG. 18, a stacking sequence which may be repetitively employed is: separator/first anode/separator/first cathode/separator/second anode/separator/second cathode. However, as mentioned above other stacking sequence may be employed. Additionally, as an example, one or more stacking sequences may be used throughout the stack. As a further example, after stacking and repeating the stacking sequence or sequences a number of times, a layer of separator material may be used such that the stack begins and ends with layers of separator material. As a further example, after stacking, the trailing edge of separator may be taped in place to maintain its position during subsequent cell manufacturing steps.

Referring now to FIG. 7, after tab shaping and trimming each pair of at least two tab groups (for example, 612 and 614 of FIG. 6) may be welded to a first extension tab 702 and second extension tab 704, the width of the first and second extension tabs may be at least equal to twice the electrode tab width plus the gap between the two tab groups, 612 and 614, in one example. Two separate ultrasonic welds are employed to consolidate the two electrode tab groups to the single extension tab. The two welds may be accomplished simultaneously with a single welding horn, in one instance. This welding may be performed separately on both the two groups of anode tabs and on the anode extension tab and also on the two groups of cathode tabs and on the cathode extension tab. As an example, the two groups of anode tabs 614 may be welded to an anode extension tab 704, and the two groups of cathode tabs 612 may be welded to a cathode extension tab 702. The extension tabs 702 and 704 allow different groups of offset tabs to be electronically coupled.

In some examples, the tabs 612 and 614 may be sandwiched between the extension tabs 702 and 704, and electrode tab supports 706, and 708, respectively. However, in other examples, the tabs may be directly welded to the extension tabs without the electrode tab supports. In other examples, the respective tab groups 602 and 604, shown in FIG. 6, and then the tab groups 606 and 608, shown in FIG. 6, may be welded to extension tabs 702 and 704, shown in FIG. 7. Such a process may be used to consolidate the tab groups before adding the tab supports 706 and 708 and may provide a more robust electrode assembly.

The electrode tab supports 706 and 708 increase the structural integrity of the tab assembly thereby reducing the likelihood of tab damage occurring during battery use and/or manufacturing. As a result, the durability of the battery cell system is increased. The electrode tab supports 706 and 708 each include a slit 710 and 712, respectively, through which the extension tabs 702 and 704 may extend, in the illustrated example. However, other electrode tab support profiles have been contemplated. Additionally, in one example, the electrode tab supports 706 and/or 708 may include an electrically insulating polymeric material 714. The electrically insulating polymeric material 714 may be designed to provide electrical isolation between the extension tabs 702 and 704 and components such as a protective housing, described in greater detail herein. Further, in some examples, the electrode tab supports 706 and 708 may be integrally formed with the protective housing or are directly physically coupled to the protective housing.

Additionally, in one example, the cathode tabs 612 may include an aluminum material and the anode tabs 614 may include a nickel plated copper material. However, additional or alternative material may be included in the anode and/or cathode tabs, in other examples.

Figure 8:
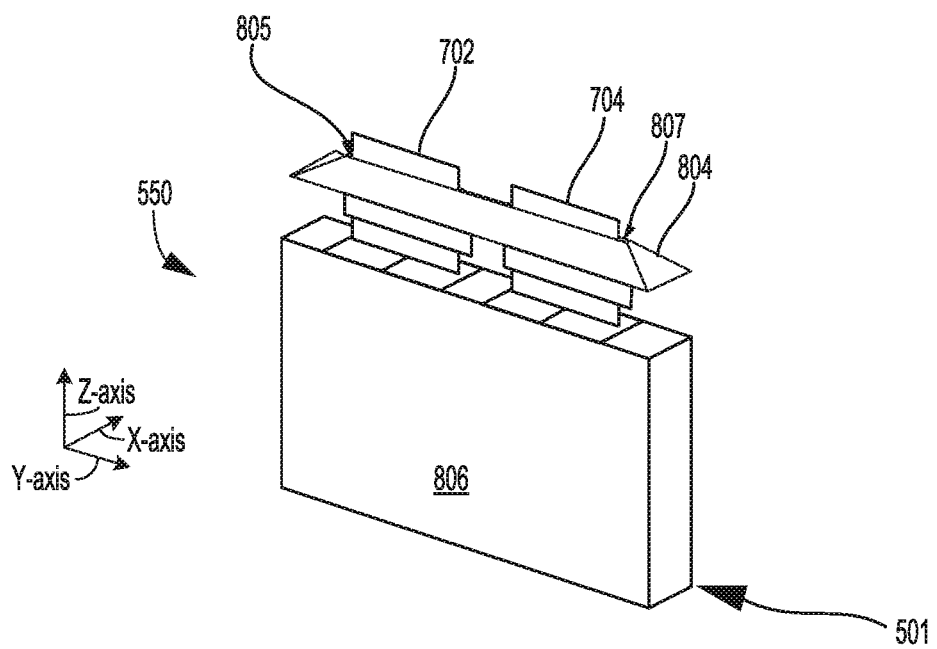
FIG. 8 shows an electrode stack with a top frame in the battery cell system.

Referring now to FIG. 8, after welding of the extension tabs, a structural frame 501 containing the electrode stack is assembled. In one example, in a cell configuration having both positive and negative tabs on a single cell face, there may only be a single molded frame assembly on that face. In another example, if the tabs extend from opposing sides of the electrode stack, then two molded frame assemblies may be used. The structural frame 501 may include at least one support 804 (e.g., polymer support). In the illustrated example, the support 804 has a substantially triangular cross section with chamfered edges, to match the resulting shape of the laminate pouch packaging. However, other profiles of the support 804 have been contemplated. Additionally, the support 804 includes two slots 805 and 807 sized to allow the extension tabs 702 and 704 to pass through the central region of the support. The structural frame 501 may be fabricated in two matching halves which are then assembled onto the tabbed side of the cell by snap fitting or press fitting the two molded frame halves together, in one example. Furthermore, the support 804 may be injection molded, in one example. Additionally, the support 804 has a triangular cross-section in a Z-Y plane, in the illustrated example. Thus, the support 804 may taper in the vertical direction. However, other shapes of the support 804 have been contemplated and may be used, in other examples. For instance, the support 804 may have rectangular cross-section or the support may include curved (e.g., convex or concave) sections. Furthermore, the support 804 may be attached (e.g., welded, adhesively bonded, mechanically coupled, combinations thereof, etc.) to a base 806 of the structural frame 501.

Figure 9:
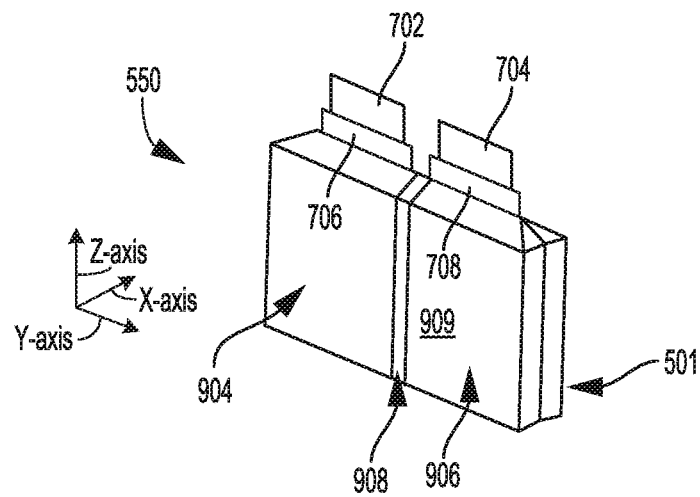
FIG. 9 shows a structural frame with a stack assembly in the battery cell system.

Referring next to FIG. 9, it shows the structural frame 501 (e.g., internal box) assembled and providing mechanical separation of the tabs and electrode stack from the internal surfaces of the laminate pouch packaging material, thereby protecting the pouch from mechanical damage and loss of electrical isolation due to impact, vibration or shock during handling or subsequent environmental exposure in the battery application environment. The structural frame may be fabricated in two separate halves, 904 and 906, by injection molding and may be assembled onto the welded electrode stack by press fitting or snap fitting. Additionally, a further enhancement of the structural frame may include a reduced thickness area 908 on one face 909 of the structural frame 501, thereby creating a recessed groove to provide mechanical relief to a heat sealed seam of the laminate pouch which may be applied in the next assembly step. In one example, the structural frame 501 may be injection molded. However, other frame manufacturing techniques have been contemplated.

Structural frame 501 may then be packaged and/or vacuum sealed within a protective housing. In one example, the protective housing may be a laminate pouch, such as the laminate pouch 1200 shown in FIG. 12, with an internal protective structure with a recessed seam relief groove, as described above. However, other types of protective housing have been contemplated, such as a housing that has a greater rigidity.

An example of a laminate pouch 1900 is shown in FIG. 19. It will be appreciated that the laminate pouch 1900 is an example of the previously described laminate pouch 1200 included in the cell battery system 550. The laminate pouch 1900, shown in FIG. 19, may include at least two layers and, in some examples, four functional layers to create a heat sealable laminate with at least one metallic layer which reduces (e.g., prevents) moisture ingress into the finished electrochemical cell, having a non-aqueous electrolyte. The inner most layer 1902 may be a heat sealable polyolefin, such a polypropylene, bonded to an aluminum layer 1904 which may be bonded to another polymer layer 1906 (e.g., a nylon layer) which in turn may be bonded to the external layer 1908 (e.g., a polyethylene terephthalate (PET) layer). As an example, the layers 1902, 1904, 1906, and 1908 may be rearranged as desired based on end-use design goals. The laminate pouch 1900 may be included in a battery cell system 1950. It will be appreciated that the battery cell system 1950 may be an example of the battery cell system 550, shown in FIGS. 2A-18. The laminate pouch 1900 may include one or more walls that accommodate expansion during electrolyte activation, in one example. Further, in such an example, the walls of the laminate pouch may be substantially flat after electrolyte activation and bent inward prior to electrolyte activation. In this way, the pouch may accommodate expansion to reduce the likelihood of pouch and/or cell damage.

Figure 10:
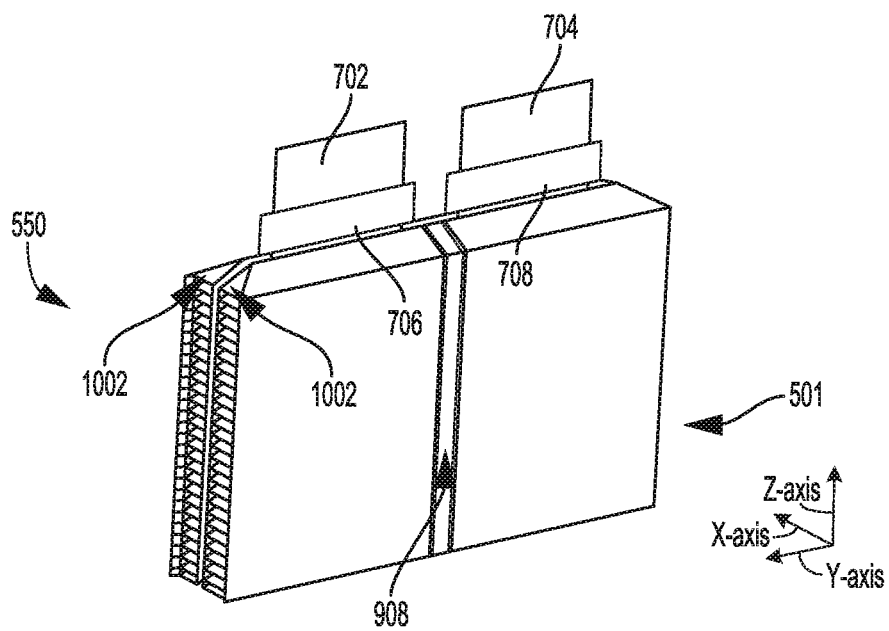
FIG. 10 shows an electrode stack with a structural frame in the battery cell system.

Turning now to FIG. 10, as a further example, assembling the battery cell system 550 may optionally include first assembling the structural frame 501 around the exterior of the welded electrode stack assembly in order to protect the electrode stack edges from mechanical damage during assembly and use as well as to protect the electrode stack edges from external pressure (e.g., a pressure of at least 14.6 pounds per square inch (psi)) created when the cell assembly is vacuum sealed. The internal frame may include at least a protective frame placed around the welded tab area of the electrode stack. The top side of the structural frame may have a substantially triangular cross sectional shape and tapered edges 1002, 1004 at the ends to match with the shape of the folded pouch laminate packaging. Optionally the structural frame 501 may be extended to prevent the edges and corners of the electrode stack from making direct contact with the internal surface of the pouch laminate material, thereby preventing loss of internal electrical isolation by mechanical damage to the inner heat sealable polymer layer and exposing the Aluminum layer to electrical contact with the electrochemically active electrodes.

In one example, the internal structural frame may be fabricated in two matching halves with a flexible gap between each frame half, shown in FIGS. 9 and 10. The reduced thickness area 908 of the structural frame 501 allows the finished cell and electrode stack to be compressed in the normal thickness direction during the cell's electrochemical activation, formation and degassing processes. This compression being applied as a means to eliminate gas bubbles between the electrode and separator surfaces which form as a byproduct of the cell's electrochemical formation processes, such as anode SEI formation, reaction with residual moisture in the cell and/or other parasitic chemical reactions which generate gaseous byproducts. The flexible gap further allows the cell thickness to increase/decrease during cell charging and discharging due to electrode swelling caused by the changing state of charge. The structural frame (e.g., internal fabricated support frame) may be fabricated by injection molding a chemically compatible polymer such as polypropylene, polyethylene, polybutylene terephthalate (PBT), and/or polyethylene terephthalate (PET), for example.

Figure 11:
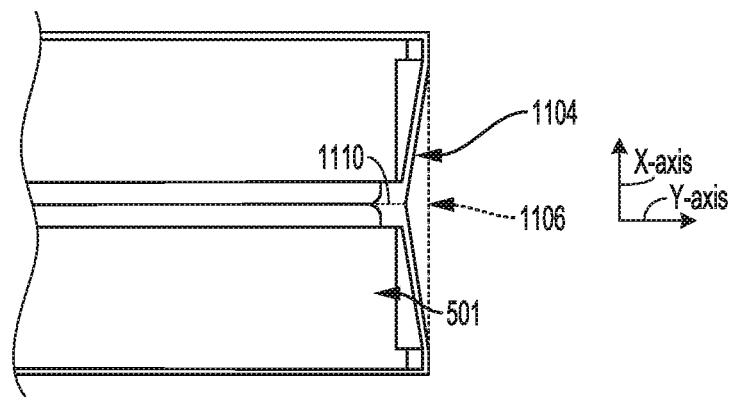
FIG. 11 shows a structural frame sidewall designed for strain relief in the battery cell system.

Turning now to FIG. 11, as an example, in order to accommodate electrode stack swelling during cell electrolyte activation, formation, and use, the vertical side walls 1104 of the structural frame 501 and/or protective housing, discussed in greater detail herein, may be tapered inward toward the center-line 1110 of the cell, allowing extra material to accommodate cell expansion and retraction. The extra material reduces the likelihood of wrinkling and cracking in the battery cell system. As the cell swells, indicated at 1106, during the normal cycling of the battery, the extra material may provide strain relief so as not to damage the central seam. The electrode stack and frame assembly may then be packaged within the laminate pouch. As a further example, the above-mentioned feature of tapered-inward sides of the structural frame 501 may be used in order to relieve pressure on other edges or faces of the battery. Thus, other edges or faces of the battery may have tapered-inward sides.

Figure 12:
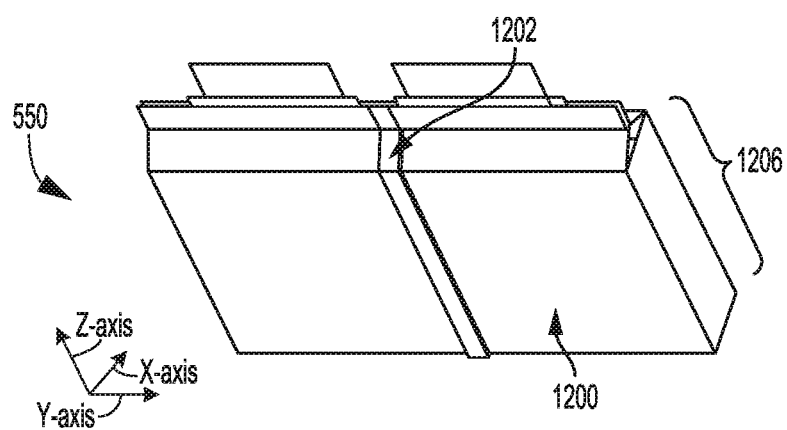
FIG. 12 shows a protective housing surrounding an electrode stack in the battery cell system.

Turning to FIG. 12, the battery cell system includes a protective housing in the form of a laminate pouch 1200, in the illustrated example. However, as previously discussed other suitable types of protective housings have been contemplated.

As shown in FIG. 12, the laminate pouch 1200 may be formed into a rectangular cross sectional shape and one section (e.g., end) may be folded and heat sealed. As such, a heat seam 1202 extends (e.g., vertically extends) down the laminate pouch, in the illustrated example. In this way, a closed end of the laminate pouch may be formed. Furthermore, the heat seam 1202 may be aligned with the reduced thickness area 908 in the structural frame 501, shown in FIG. 10. In this way, the heat seam 1202 may be mated with the reduced thickness area 908, in one example. However, it will be appreciated that the heat seam 1202 may be positioned in other locations, in other examples.

Additionally, a solid rectangular sizing fixture 1206, having the same dimensions as the electrode stack, may be placed inside the laminate pouch to maintain a desired rectangular shape while one end may be folded and heat sealed, in some examples.

One example of an assembly sequence for a laminate pouch may be as follows: the laminate pouch material may be taken from a continuous roll and first rolled into tubular form with an overlapping section of 2 to 20 mm wide. As an example, the overlapping section may be 10 mm wide. The overlapping section may be heat sealed using flat heating bars and folded flat with respect to the unsealed surface.

The pouch folding may include, in one example, displacing a triangular shaped area on each of the two narrow sides of the pouch while compressing the long faces of the pouch perpendicular direction with respect to the pouch's narrow side walls. Additionally, the pouch 1200 may be selectively heat sealed along a narrow width adjacent to the sidewall edges of the pouch package. The center area may be left unsealed at this step to allow electrolyte filling during future assembly steps, in some examples.

Turning now to FIGS. 13A and 13B, after folding and heat sealing the bottom closed end of the laminate pouch 1200, the rectangular sizing fixture 1206 may be removed and the electrode stack and molded plastic frame assembly may be inserted with tabs facing away from the closed end of the pouch package. The corner triangular folds may be accomplished in similar fashion as were the bottom closed end triangular folds. The top open end may be compressed and the pouch may be heat sealed both to the electrode tab supports 706 and 708 and to the opposing face of the pouch, creating a seal at the top tab end of the cell. A fill port may also be incorporated into this concept. This feature can be integrated with the injection molded protective frame or as a separate part fused to the pouch material or frame. The surrounding area of the structural frame may be heat sealed to the internal polymer layer of the pouch, creating a leak tight seal. Additionally, an untrimmed end 1306 of the laminate pouch 1200 may be employed for cell filling and gas formation collection.

FIG. 14 shows an additional view of the laminate pouch 1200 with the additional untrimmed end 1306 of laminate pouch.

Figure 15:
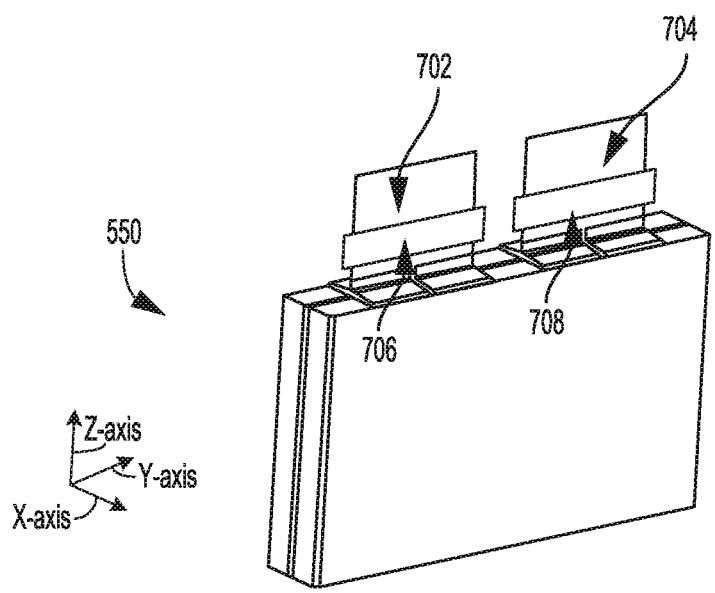
FIG. 15 shows a welded electrode stack in the battery cell system.

FIG. 15 shows an alternate view of the electrode welded stack before the addition of the structural frame or the addition of a protective housing (e.g., laminate pouch) before a structural frame or sizing fixture has been added.

Turning now to FIG. 16, a port 1602 (e.g., fill port) in the laminate pouch 1200 may be molded with internal or external threads and used for electrolyte filling and/or degassing of the cell during the formation process, thereby reducing the quantity of pouch material used in manufacturing in comparison to the current formation process. In some instances, incorporation of the filling/degassing port may reduce the amount of pouch material used for forming of the battery cell by 40% (compared to forming the battery cell without a filling/degassing port). The current formation process uses an integral gas volume formed with extra length of pouch material, creating an extra internal void volume to accommodate gasses generated during the initial cell formation process.

Turning to FIG. 17, the above-mentioned fill port may incorporate a vent/rupture disc 1702 in the laminate pouch 1200 which may help to manage pressure relief, thereby providing controlled venting under operating conditions or extreme conditions in which the cell has been run or handled outside normal operating conditions (e.g., physical damage to battery, exposure to extreme heat etc.).

With reference to FIG. 17, after formation, the cell may be vacuum degassed and sealed. In the current process the extra pouch material may be trimmed off during a vacuum sealing step and discarded. The cell may be vacuum degassed through the integrated fill port during this degassing step. After degassing the fill port may be sealed by several methods, such as a heat sealed plug or threaded plug. As an example, further enhancement to cell safety under abusive conditions may be made and a pressure relief vent is installed in the fill port sealing plug. The fill port may have a vent cap plug that will rupture or open at a specified pressure to control the rate of gas ejection from the cell, decreasing the probability of explosion or fire during exposure to abusive conditions. Adding a plug or disc may in some instances incorporate the sealing methods mentioned above, not limited to heat sealing or threading. As an example, controlled venting may also incorporate a scored or coined slit on the pouch to rupture before heat seal failure. As an example, scoring or slitting the pouch may be added to any desirable location on the pouch.

It should be understood that the figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 20 shows a method 2000 for manufacturing a battery cell system. The method 2000 may be used to manufacture the battery cell systems described above with regard to FIGS. 2A-19. However, in other examples, the method may be used to manufacture other suitable battery cell systems. Furthermore, the method 2000 may be stored as instructions in memory (e.g., non-transitory memory) executable by a processor.

At 2001 the method includes forming an electrode stack with offset anode tabs and offset cathode tabs. It will be appreciated that the electrode stack may include alternating cathodes and anodes with separator sheets positioned there between, in some examples. Specifically, the anodes and cathodes may be formed in an electrode stack with the following stacking sequence; a first anode, a first layer of porous separator material, a first cathode, a second layer of porous separator material, etc. Forming the electrode stack may include steps 2002-2004.

At 2002 the method includes forming a plurality of anodes with a plurality of anode tabs, where the plurality of anode tabs include a first group of anode tabs laterally offset from a second group of anode tabs.

Next at 2004 the method includes forming a plurality of cathodes with a plurality of cathode tabs, where the plurality of cathode tabs include a first group of cathode tabs laterally offset from a second group of cathode tabs. Laterally offsetting groups of cathode tabs as well as groups of anode tabs allows the thickness of the tabs to be reduced when compared to cell stack with aligned tabs. Therefore, welding energy needed to weld the groups of tabs may be reduced. Consequently, the likelihood of degradation (e.g., melting, deformation, etc.) of the electrode tabs (e.g., anode and cathode tabs) during welding is reduced.

At 2006 the method includes welding a first extension tab to the first group of anode tabs and the second group of anode tabs. Next at 2008 the method includes welding a second extension tab to the first group of cathode tabs and the second group of cathode tabs.

Additionally, in some examples, the method may include steps 2010, 2012, 2014, and/or 2016. At 2010 the method includes attaching a first electrode tab support to the first group of anode tabs and the second group of anode tabs and at 2012 the method includes attaching a second electrode tab support to the first group of cathode tabs and the second group of cathode tabs.

At 2014 the method includes placing the electrode stack in a structural frame. The structural frame may at least partially surround the electrode stack. Further, in one example, the structural frame may include openings allowing the first and second support tabs to extend there through. Additionally, the structural frame may be molded from a polymeric material, in one example.

At 2016 the method includes placing the structural frame and the electrode stack within a protective housing. In one example, the protective housing may be a laminate pouch and therefore, the method may include in such an example, folding a laminate pouch around the electrode stack and the support frame and heat sealing the laminate pouch. In one example, subsequent to folding and heat sealing the laminate pouch, the pouch may be degassed via a degas port. After degassing the degas port may be sealed. In this way, unwanted gas may be removed from the system, thereby reducing the size of the protective housing. Consequently, the compactness of the battery cell system may be increased.

The invention will further be described in the following paragraphs. In one aspect, a battery cell system is provided that includes an electrode stack including a first anode with a first anode tab, a second anode with a second anode tab laterally offset from the first anode tab, a first cathode with a first cathode tab, and a second cathode with a second cathode tab laterally offset from the first cathode tab.

In another aspect, a method for manufacturing a battery cell system is provided. The method includes forming a plurality of anodes with a plurality of anode tabs, where the plurality of anode tabs include a first group of anode tabs laterally offset from a second group of anode tabs, forming a plurality of cathodes with a plurality of cathode tabs, where the plurality of cathode tabs include a first group of cathode tabs laterally offset from a second group of cathode tabs, welding a first extension tab to the first group of anode tabs and the second group of anode tabs, and welding a second extension tab to the first group of cathode tabs and the second group of cathode tabs. In one example, the method may further include attaching a first electrode tab support to the first group of anode tabs and the second group of anode tabs and attaching a second electrode tab support to the first group of cathode tabs and the second group of cathode tabs. In another example, the method may further include placing the plurality of cathodes and anodes in at least one of a structural frame and a protective housing at least partially surrounding the plurality of cathodes and anodes.

In another aspect, an electrochemical cell is provided that comprises a plurality of first negative electrodes comprising first negative electrode tabs, a plurality of second negative electrode comprising second negative electrode tabs, wherein the second negative electrode tabs are offset from the first negative electrode tabs, a plurality of first positive electrodes comprising first positive electrode tabs, and a plurality of second positive electrodes comprising second positive electrode tabs.

In another aspect, an electrochemical cell is provided that includes a first positive electrode and a second positive electrode forming a positive electrode group, and a first negative electrode and a second negative electrode forming a negative electrode group, wherein each electrode is separated by a layer of porous separator material, and each electrode has a tab width and offset such that no tabs of different electrodes overlap and, the at least two electrodes of the positive electrode group are welded together and the at least two electrodes of the negative electrode group are welded together.

In another aspect, an internal frame for an electrochemical cell is provided that includes an electrode tab support, the electrode tab support comprising two slots for receiving an anode and a cathode of the electrochemical cell, wherein the electrode tab support prevents lateral movement of the anode and cathode.

In another aspect, an electrochemical cell is provided that includes a stack of aligned electrodes, the stack comprising at least four groups of electrode tabs offset from one another.

In any of the aspects or combinations of the aspects, the electrode stack may further comprise a porous separator positioned between each of the first and second anode and the first and second cathode.

In any of the aspects or combinations of the aspects, the battery cell system may further include a first extension tab welded to and laterally extending between the first and second anode tabs.

In any of the aspects or combinations of the aspects, the battery cell system may further include a second extension tab welded to and laterally extending between the first and second cathode tabs.

In any of the aspects or combinations of the aspects, the battery cell system may further include an electrode tab support, wherein the electrode tab support is fitted over one or more of the first and second anodes and/or cathodes and the first and second extension tabs and provides mechanical support for the first and second extension tabs.

In any of the aspects or combinations of the aspects, the electrode tab support may include an electrically insulating polymeric material and provides electrical isolation between the first and/or extension tabs and a protective housing.

In any of the aspects or combinations of the aspects, the electrode tab support may include a first slit and a second slit for receiving the first and second extension tabs, where the first and second extension tabs extend through the first slit and the second slit in the electrode tab support.

In any of the aspects or combinations of the aspects, the battery cell system may include a structural frame at least partially surrounding the first and second anodes and the first and second cathodes.

In any of the aspects or combinations of the aspects, the electrode tab support may be integrally formed within a protective housing, or is directly physically coupled to the protective housing.

In any of the aspects or combinations of the aspects, the structural frame may include one or more walls that are flexible and are bent inwards towards the electrode stack, such that the one or more walls accommodate expansion during electrolyte activation.

In any of the aspects or combinations of the aspects, the structural frame may include one or more faces with a recessed area of reduced thickness mated with a heat seam of a protective housing.

In any of the aspects or combinations of the aspects, the battery cell system may further include a protective housing includes a port receiving an electrolyte and/or venting gasses.

In any of the aspects or combinations of the aspects, the negative electrodes and the positive electrode tabs may be offset from one another.

In any of the aspects or combinations of the aspects, the electrodes may be the same size, such that when stacked, the edges of the electrodes are aligned with one another, except for the tabs.

In any of the aspects or combinations of the aspects, the tabs may be offset when the electrodes are stacked to form an array.

In any of the aspects or combinations of the aspects, the electrochemical cell may further include a structural frame through which the electrode tabs extend.

In any of the aspects or combinations of the aspects, the structural frame limits lateral movement of the electrode tabs.

In any of the aspects or combinations of the aspects, the electrochemical cells may further comprise electrode extension tabs extending from the electrode tabs, and welded to the electrode tabs.

In any of the aspects or combinations of the aspects, the at least four groups of electrode tabs may be welded to two electrode extension tabs, and where each of the at least four groups of electrode tabs may only be welded to one of the two electrode extension tabs.

In any of the aspects or combinations of the aspects, the at least four groups of electrode tabs may comprise at least two groups of negative electrode tabs and at least two groups positive electrode tabs.

In any of the aspects or combinations of the aspects, at least four groups of electrode tabs may comprise a vertically folded portion that is welded to an extension tab.

In any of the aspects or combinations of the aspects, the electrochemical cell may further comprise an injection molded frame.

In any of the aspects or combinations of the aspects, the electrochemical cell may further comprise a multi-layered laminate pouch.

In any of the aspects or combinations of the aspects, the electrochemical cell may further comprise a multi-use port for filling the electrochemical cell with electrolyte and/or degassing the electrochemical cell.

In any of the aspects or combinations of the aspects, offset tabs of matching polarity may be welded to an electrode group tab and then may be welded to an extension tab.

In any of the aspects or combinations of the aspects, the anode tab may include nickel plated copper and the cathode tab may include aluminum.

In any of the aspects or combinations of the aspects, the electrode tab support may have a triangular cross-section.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery cell system comprising:
   an electrode stack including:
      a first anode with a first anode tab;
      a second anode with a second anode tab laterally offset from the first anode tab;
      a first cathode with a first cathode tab;
      a second cathode with a second cathode tab laterally offset from the first cathode tab,
      wherein the first anode tab, second anode tab, first cathode tab, and second cathode tab extend from one side of the electrode stack;
      a first extension tab welded to and laterally extending between the first and second anode tabs;
      a second extension tab welded to and laterally extending between the first and second cathode tabs;
      at least one electrode tab support attached to the first and second anode tabs and/or the first and second cathode tabs, wherein the at least one electrode tab support is attached to the first extension tab and/or the second extension tab, wherein the first and second anode tabs and the first and second cathode tabs are sandwiched between the at least one electrode tab support and the first and/or second extension tab, and wherein the at least one electrode tab support is fitted over the first and second anode tabs and/or the first and second cathode tabs and over the first extension tab and/or the second extension tab providing structural integrity to the cathode and anode tabs and corresponding extension tabs; and
      a protective housing; and
   a structural frame positioned between the electrode stack and the protective housing, the structural frame including a shortest edge of a vertical sidewall tapered towards a center-line of the battery cell system, wherein the vertical sidewall is symmetric with respect to the center-line of the battery cell system, and wherein a width of the vertical sidewall is a shortest width of the structural frame.

2. The battery cell system of claim 1, wherein the electrode stack further comprises a porous separator positioned between each of the first and second anode and the first and second cathode.

3. The battery cell system of claim 1, wherein the electrode tab provides mechanical support for the first and second extension tabs.

4. The battery cell system of claim 3, wherein the electrode tab support includes an electrically insulating polymeric material and provides electrical isolation between the first and/or second extension tabs and a protective housing.

5. The battery cell system of claim 3, wherein the electrode tab support includes a first slit and a second slit for receiving the first and second extension tabs, and wherein the first and second extension tabs extend through the first slit and the second slit in the electrode tab support.

6. The battery cell system of claim 3, wherein the electrode tab support is integrally formed within the protective housing, or is directly physically coupled to the protective housing.

7. The battery cell system of claim 1, wherein the structural frame at least partially surrounds the first and second anodes and the first and second cathodes, and wherein the structure frame includes a support, the support including two slots configured to allow the first and second extension tabs to pass through a central region of the support.

8. The battery cell system of claim 7, wherein the structural frame includes one or more walls that are flexible and are tapered inwards towards the electrode stack, such that the one or more walls accommodate expansion during electrolyte activation.

9. The battery cell system of claim 1, wherein the protective housing includes a port receiving an electrolyte and/or venting gasses.

10. A battery cell system comprising:
   an electrode stack including:
      a first anode with a first anode tab;
      a second anode with a second anode tab laterally offset from the first anode tab;
      a first cathode with a first cathode tab extending upwardly;
      a second cathode with a second cathode tab laterally offset from the first cathode tab;
      a first extension tab welded to and laterally extending between the first and second anode tabs;
      a second extension tab welded to and laterally extending between the first and second cathode tabs,
      wherein the first anode tab, second anode tab, first cathode tab, and second cathode tab extend from one side of the electrode cell stack; and
      a protective housing,
      wherein the protective housing includes an internally and/or externally threaded port and a complementary threaded plug positioned on an outwardly angled long face of the protective housing extending downward, capable of receiving an electrolyte and venting gasses during battery operation; and
   a structural frame positioned between the electrode stack and the protective housing, the structural frame including a shortest edge of a vertical sidewall tapered towards a center-line of the battery cell system, wherein the vertical sidewall is symmetric with respect to the center-line of the battery cell system, and wherein a width of the vertical sidewall is a shortest width of the structural frame.

11. The battery cell system of claim 10, wherein the electrode stack further comprises a porous separator positioned between each of the first and second anode and the first and second cathode.

12. The battery cell system of claim 10, further comprising an electrode tab support, wherein the electrode tab support is fitted over and attached to one or more of the first and second anodes and/or cathodes and the first and second extension tabs and provides mechanical support for the first and second extension tabs.

13. The battery cell system of claim 12, wherein the electrode tab support is integrally formed within a protective housing.

14. The battery cell system of claim 12, wherein the electrode tab support is directly physically coupled to the protective housing.

15. The battery system of claim 8, wherein the structural frame is formed by injection molding.

16. The battery system of claim 15, wherein the structural frame includes two halves fit together by a snap fitting or press fitting.

17. The battery system of claim 10, wherein the protective housing is filled with electrolyte and degassed from an untrimmed end of the protective housing.

18. A battery cell system comprising:
an electrode stack including:
  a first anode with a first anode tab;
  a second anode with a second anode tab laterally offset from the first anode tab;
  a first cathode with a first cathode tab extending upwardly;
  a second cathode with a second cathode tab laterally offset from the first cathode tab;
  a first extension tab welded to and laterally extending between the first and second anode tabs;
  a second extension tab welded to and laterally extending between the first and second cathode tabs,
  wherein the first anode tab, second anode tab, first cathode tab, and second cathode tab extend from one side of the electrode cell stack; and
a protective housing; and
a structural frame positioned between the electrode stack and the protective housing, wherein the structural frame includes a support, the support including a two slots positioned in a central region of the support configured to allow the first extension tab and the second extension tab to pass through, wherein the support tapers in a vertical direction, and a cross-section of the support is triangular, and including a shortest edge of a vertical sidewall tapered towards a center-line of the battery cell system, wherein the vertical sidewall is symmetric with respect to the center-line of the battery cell system, and wherein a width of the vertical sidewall is a shortest width of the structural frame.

* * * * *